(12) United States Patent
Yi et al.

(10) Patent No.: US 11,239,518 B2
(45) Date of Patent: Feb. 1, 2022

(54) RECHARGEABLE BATTERY AND DISPLAY DEVICE INCLUDING THE SAME

(71) Applicant: Samsung SDI Co., Ltd., Yongin-si (KR)

(72) Inventors: Jeongdoo Yi, Yongin-si (KR); Jungyup Yang, Yongin-si (KR); Junwon Suh, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 134 days.

(21) Appl. No.: 16/494,510

(22) PCT Filed: Feb. 22, 2018

(86) PCT No.: PCT/KR2018/002215
§ 371 (c)(1),
(2) Date: Sep. 16, 2019

(87) PCT Pub. No.: WO2018/169227
PCT Pub. Date: Sep. 20, 2018

(65) Prior Publication Data
US 2020/0020898 A1   Jan. 16, 2020

(30) Foreign Application Priority Data
Mar. 14, 2017   (KR) .......................... 10-2017-0032039

(51) Int. Cl.
*H01M 50/00* (2021.01)
*H01M 50/172* (2021.01)
(Continued)

(52) U.S. Cl.
CPC ......... *H01M 50/172* (2021.01); *H01M 50/10* (2021.01); *H01M 50/183* (2021.01); *H01M 50/531* (2021.01); *H01M 2220/30* (2013.01)

(58) Field of Classification Search
CPC .. H01M 50/172; H01M 50/183; H01M 50/10; H01M 2220/30; Y02E 60/10
See application file for complete search history.

(56) References Cited

U.S. PATENT DOCUMENTS

| | | | |
|---|---|---|---|
| 7,285,334 B1 | 10/2007 | Yamashita et al. | |
| 2013/0011722 A1* | 1/2013 | Ahn | H01M 50/172 429/179 |

(Continued)

FOREIGN PATENT DOCUMENTS

| | | |
|---|---|---|
| JP | 2008-293982 A | 12/2008 |
| JP | 5103691 B2 | 12/2012 |

(Continued)

OTHER PUBLICATIONS

Korean Office Action dated Mar. 30, 2021, issued in corresponding Korean Patent Application No. 10-2017-0032039 (8 pages).

*Primary Examiner* — Cynthia H Kelly
*Assistant Examiner* — Monique M Wills
(74) *Attorney, Agent, or Firm* — Lewis Roca Rothgerber Christie LLP

(57) ABSTRACT

The present disclosure relates to a rechargeable battery including: an electrode assembly including a first electrode, a second electrode, and a separation layer interposed between the first electrode and the second electrode, a first electrode tab electrically connected to the first electrode, a second electrode tab electrically connected to the second electrode, and a first exterior member and a second exterior member receiving the electrode assembly and disposed to face each other, wherein at least one of the first exterior member and the second exterior member includes at least one of a first draw-out unit drawing out the first electrode tab and a second draw-out unit drawing out the second electrode tab, and a display device including the same.

20 Claims, 11 Drawing Sheets

(51) Int. Cl.
    *H01M 50/10*     (2021.01)
    *H01M 50/183*     (2021.01)
    *H01M 50/531*     (2021.01)

(56) References Cited

U.S. PATENT DOCUMENTS

| | | | |
|---|---|---|---|
| 2014/0011060 A1 | 1/2014 | Yang et al. | |
| 2014/0313746 A1* | 10/2014 | Song | G06F 1/1626 362/362 |
| 2015/0188100 A1 | 7/2015 | Isozaki et al. | |
| 2016/0049633 A1* | 2/2016 | Kang | H01M 50/531 429/211 |
| 2016/0056515 A1 | 2/2016 | Nam et al. | |
| 2016/0087250 A1 | 3/2016 | Gu et al. | |
| 2016/0127525 A1 | 5/2016 | Lee et al. | |
| 2017/0358783 A1* | 12/2017 | Kim | H01M 50/172 |

FOREIGN PATENT DOCUMENTS

| | | |
|---|---|---|
| KR | 10-2007-0027351 A | 3/2007 |
| KR | 10-0865399 B1 | 10/2008 |
| KR | 10-2013-0080071 A | 7/2013 |
| KR | 10-2013-0099892 A | 9/2013 |
| KR | 10-2013-0117637 A | 10/2013 |
| KR | 10-2014-0084570 A | 7/2014 |
| KR | 10-2014-0134185 A | 11/2014 |
| KR | 10-2015-0038864 A | 4/2015 |
| KR | 10-2015-0043840 A | 4/2015 |
| KR | 10-2015-0076101 A | 7/2015 |
| KR | 10-2016-0050698 A | 5/2016 |

\* cited by examiner

RECHARGEABLE BATTERY AND DISPLAY DEVICE INCLUDING THE SAME

CROSS-REFERENCE TO RELATED APPLICATION(S)

This application is a National Phase Patent Application of International Patent Application Number PCT/KR2018/002215, filed on Feb. 22, 2018, which claims priority of Korean Patent Application No. 10-2017-0032039, filed Mar. 14, 2017. The entire contents of both of which are incorporated herein by reference.

TECHNICAL FIELD

The present disclosure relates to a rechargeable battery and a display device including the same.

BACKGROUND ART

A rechargeable battery consists of an electrode assembly consisting of a positive electrode and a negative electrode with a separator interposed between the positive electrode and the negative electrode, and a case in which the electrode assembly is accommodated. The case of the rechargeable battery may have various forms, such as a cylindrical case, a prismatic case, and a pouch-type case.

The pouch-type case is particularly suitable for making thin cells, and has a merit that is easy to manufacture due to its simple structure, thereby being mainly used.

DETAILED DESCRIPTION OF THE INVENTION

Technical Problem

An exemplary embodiment of the present disclosure is to provide a rechargeable battery with improved resistance to moisture permeability and flexibility.

Another exemplary embodiment of the present disclosure is to provide a display device including the rechargeable battery.

Technical Solution

In an aspect, the present disclosure provides a rechargeable battery including an electrode assembly including a first electrode, a second electrode, and a separation layer interposed between the first electrode and the second electrode, a first electrode tab electrically connected to the first electrode, a second electrode tab electrically connected to the second electrode, and a first exterior member and a second exterior member receiving the electrode assembly and disposed to face each other, wherein at least one of the first exterior member and the second exterior member includes at least one of a first draw-out unit drawing out the first electrode tab and a second draw-out unit drawing out the second electrode tab.

In another aspect, the present disclosure provides a display device including a substrate, a display panel disposed on a first surface of the surface, and the rechargeable battery according to the present disclosure disposed on a second surface of an opposite surface of the first surface and electrically connected to the display panel to supply power.

Advantageous Effects

The rechargeable battery according to the exemplary embodiment of the present disclosure may have the exterior member sealed in one process, so it has excellent moisture barrier properties and excellent flexibility.

The display device according to another exemplary embodiment of the present disclosure includes the rechargeable battery as a power supply device, thereby enabling the display device having excellent flexibility.

MODE FOR INVENTION

Figure 1:
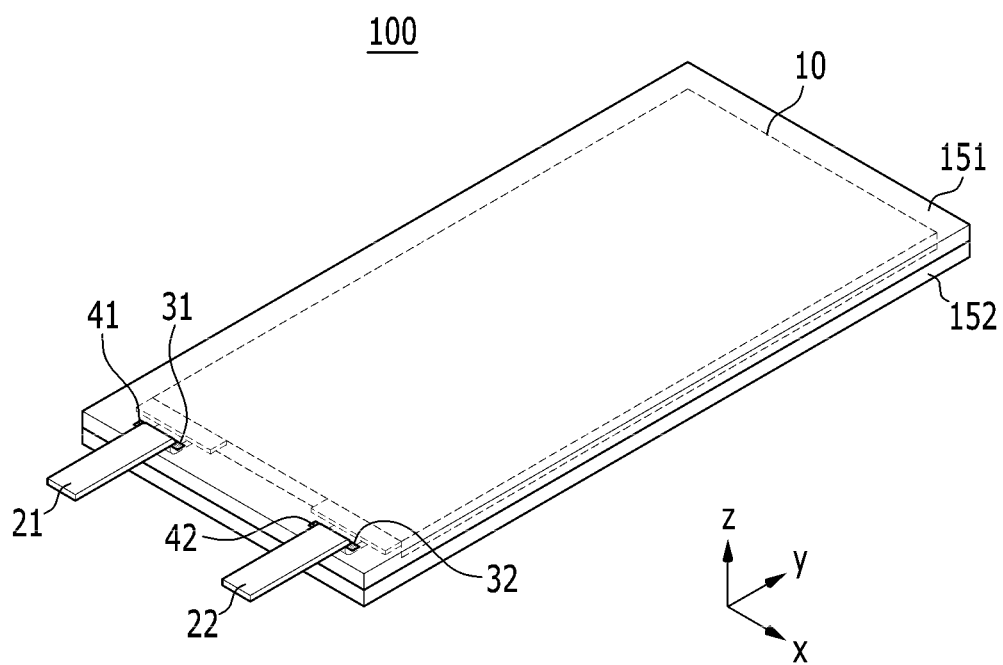
FIG. 1 is a perspective view of a rechargeable battery according to an exemplary embodiment of the present disclosure.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are arbitrarily represented for better understanding and ease of description, and the present invention is not limited thereto.

In addition, unless explicitly described to the contrary, the word "comprise" and variations such as "comprises" or "comprising" will be understood to imply the inclusion of stated elements but not the exclusion of any other elements.

Figure 2:
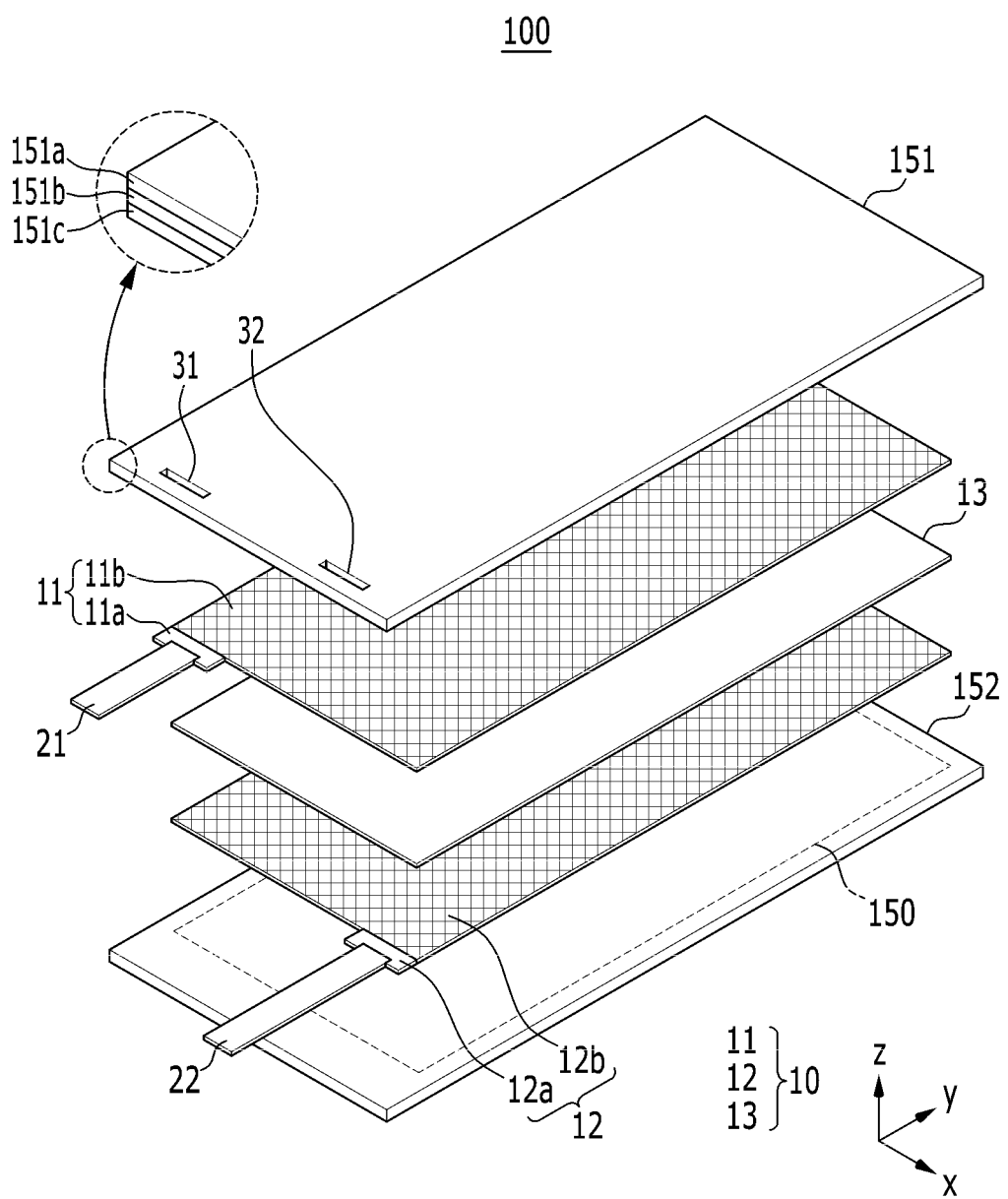
FIG. 2 is an exploded perspective view of a rechargeable battery of FIG. 1.
Figure 3:
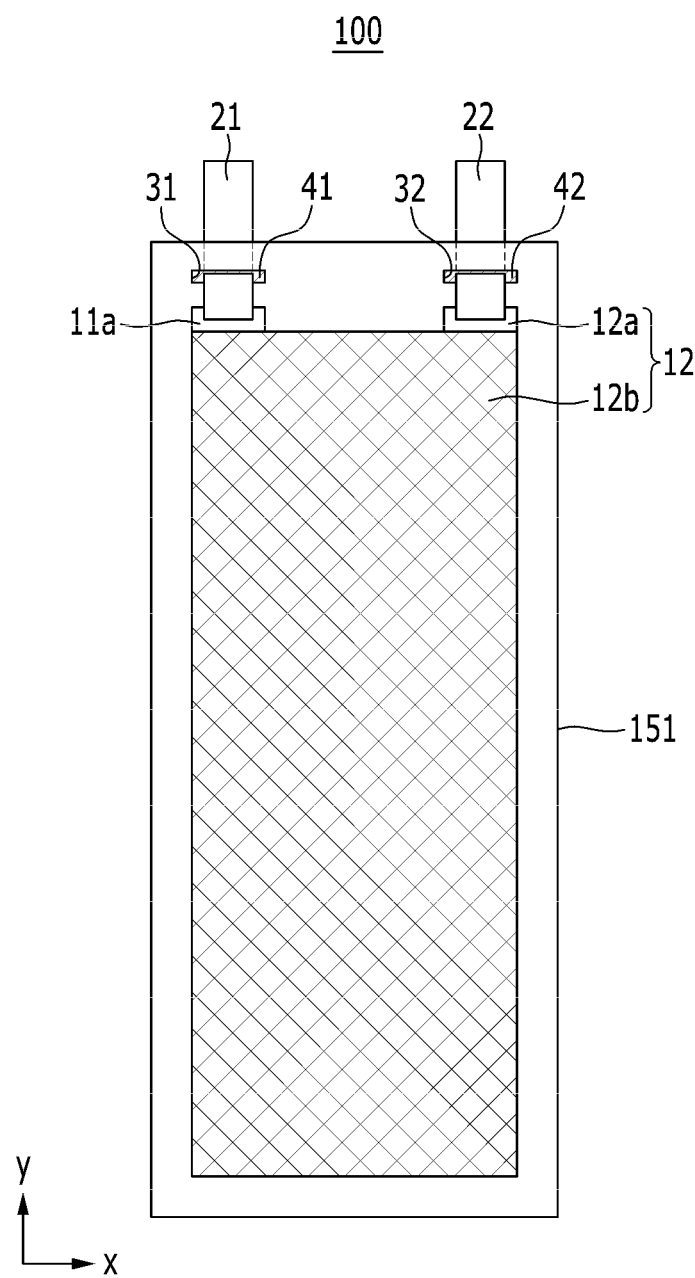
FIG. 3 is an xy top plan view viewed from below a z axis after removing a second exterior member in FIG. 1.

FIG. 1 is a perspective view of a rechargeable battery according to an exemplary embodiment of the present disclosure, FIG. 2 is an exploded perspective view of a rechargeable battery of FIG. 1, and FIG. 3 is an xy top plan view viewed from below a z axis after removing a second exterior member in FIG. 1.

Referring to FIG. 1 to FIG. 3, a rechargeable battery 100 according to an exemplary embodiment of the present disclosure includes an electrode assembly 10, a first electrode tab 21 and a second electrode tab 22 electrically connected to the electrode assembly 10, and a first exterior member 151 and a second exterior member 152 receiving the electrode assembly 10.

The first exterior member 151 and the second exterior member 152 are disposed to face each other and receive the electrode assembly 10 inside. The first exterior member 151 and the second exterior member 152 are attached to each other through an encapsulation region 150 disposed along the edge of the second exterior member 152. Although the encapsulation region 150 is formed in the second exterior member 152 in FIG. 2, the encapsulation region may be disposed along the edge of the first exterior member 151.

In the present disclosure, at least one of the first exterior member 151 and the second exterior member 152 may include at least one of a first draw-out unit 31 and a second draw-out unit 32.

Referring to FIG. 1 to FIG. 3, in the present exemplary embodiment, the first draw-out unit 31 and the second draw-out unit 32 may be disposed with a predetermined interval at one end of the first exterior member 151. That is, the first draw-out unit 31 and the second draw-out unit 32 may be disposed side by side in the x-axis direction at one end of the first exterior member 151. In addition, although not shown, the first draw-out unit 31 and the second draw-out unit 32 may be disposed with the predetermined interval at one end of the second exterior member 152.

The first draw-out unit 31 and the second draw-out unit 32 are formed through at least one of the first exterior member 151 and/or the second exterior member 152. Accordingly, the first draw-out unit 31 serves to draw out the first electrode tab 21 to the outside of the exterior member, and the second draw-out unit 32 serves to draw out the second electrode tab 22 to the outside of the exterior member.

As long as the first electrode tab 21 and the second electrode tab 22 may be drawn out without damage, the shape forming the part penetrating the first exterior member 151 and/or the second exterior member 152 to form the first draw-out unit 31 and the second draw-out unit 32 is not specifically limited.

Next, since the first draw-out unit 31 and the second draw-out unit 32 are formed by penetrating the first exterior member 151 and/or the second exterior member 152, it is necessary to seal the first and second electrode tabs 21 and 22 after they are drawn out. That is, the first draw-out unit 31 and the second draw-out unit 32 may be sealed by a first encapsulation unit 41 and a second encapsulation unit 42, respectively.

At least one of the first encapsulation unit 41 and the second encapsulation unit 42 may include one kind or more selected from a group including polyisobutylene (PIB), butyl rubber, polytetrafluoroethylene (PTFE), epoxy, polydimethylsiloxane (PDMS), polypropylene (PP), polyethylene (PE), and ceramic.

In the electrode assembly 10, a first electrode 11 and a second electrode 12 are alternately stacked, and a separation layer 13 is interposed between the first electrode 11 and the second electrode 12. Also, the first electrode 11 is electrically connected to the first electrode tab 21, and the second electrode 12 is electrically connected to the second electrode tab 22.

FIG. 2 shows only one first electrode 11, one second electrode 12, and one separation layer 13 each having a rectangular sheet shape, but a plurality of first electrodes 11 and second electrodes 12 may be alternately stacked with the separation layer 13 interposed therebetween. In addition, the separation layer may be interposed between the band-shaped first electrode and second electrode, and they are pressed after being spiral-wound to form a flat structure.

In the present disclosure, the first electrode 11 may be a positive electrode and the second electrode 12 may be a negative electrode, however, if necessary, the first electrode 11 may be the negative electrode and the second electrode 12 may be the positive electrode. Hereinafter, for convenience, a case in which the first electrode 11 is the positive electrode and the second electrode 12 is the negative electrode is described as an example.

The first electrode 11 includes a coated region 11b coated with a positive electrode active material on a current collector made of a metal thin plate, and an uncoated region 11a set as an exposed current collector without having the positive electrode active material coated thereon. For example, the current collector of the first electrode 11 and the first electrode tab 21 may be formed of aluminum (Al).

The second electrode 12 includes a coated region 12b in which the active material and the negative active material of the first electrode 11 are coated on the current collector made of the metal thin plate, and an uncoated region 12a that is set as the exposed current collector by not having the negative active material coated thereon. For example, the current collector of the second electrode 12 and the second electrode tab 22 may be formed of copper (Cu).

Also, the coated regions 11b and 12b may be formed on both surfaces of the current collector of the first electrode 11 and the second electrode 12. However, in the case of the first electrode 11 and/or the second electrode 12 disposed at the outermost of the electrode assembly 10, when considering an energy density and thinning of the electrode assembly 10, it is preferable that the coated regions 11b and 12b are not formed at the part that is in contact with the first exterior member 151 and the second exterior member 152.

The first electrode 11 and the second electrode 12 may have the uncoated regions 11a and 12a alternately arrange at both sides of a width direction (an x-axis direction). That is, in FIG. 3, the uncoated region 11a of the first electrode 11 is disposed on the left side, and the uncoated region 12a of the second electrode 12 is disposed on the right side.

In addition, the first electrode tab 21 is connected to the uncoated region 11a of the first electrode 11, and the second electrode tab 22 is connected to the uncoated region 12a of the second electrode 12. Thus, outside one side of the first exterior member 151 and the second exterior member 152, the first and second electrode tabs 21 and 22 are disposed with a predetermined interval to be spaced apart. The first and second electrode tabs 21 and 22 may be welded to the uncoated regions 11a and 12a, or the uncoated regions 11a and 12a may be stretched long to be configured to serve as the first and second electrode tabs 20 and 21.

The positions of the uncoated region 11a of the first electrode 11 and the uncoated region 12a of the second electrode 12 may be changed depending on the positions of the above-described first draw-out unit 31 and second draw-out unit 32, and accordingly the positions of the first and second electrode tabs 21 and 22 may be changed together.

The separation layer 13 separates the first electrode 11 and the second electrode 12 and provides a passage for the ions, and any may be used as long as it is commonly used in rechargeable batteries. For example, it may be selected from glass fiber, polyester, polyethylene, polypropylene, polytetrafluoroethylene, or combinations thereof, and may be in a form of a non-woven fabric or a woven fabric. In addition, a separation layer coated with a composition containing a ceramic component or a polymer material may be used to secure heat resistance or mechanical strength, and may be optionally used as a single layer or a multi-layered structure.

Meanwhile, the first exterior member 151 may have a structure in which a first resin layer 151a, a moisture barrier layer 151b, and a second resin layer 151c are sequentially stacked, and the second resin layer 151c is disposed to be in contact with the electrode assembly 10. The second exterior member 152 may have the same structure as the first exterior member 151.

The first resin layer 151a serves as a base material and a protective layer. The first resin layer 151a, for example, may be formed of one or more selected from a group consisting of polyethylene terephthalate, polybutylene terephthalate, polyethylene naphthalate, polybutylene naphthalate, a copolymerized polyester, polycarbonate, and nylon film, but is not limited thereto.

The moisture barrier layer 151b may function to prevent moisture from penetrating into the rechargeable battery 100 according to the present disclosure. The moisture barrier layer 151b may be formed of, for example, at least one material selected from a group including an alloy of iron (Fe), carbon (C), chromium (Cr) and manganese (Mn), an alloy of iron (Fe), carbon (C), chromium (Cr), and nickel (Ni), copper (Cu), aluminum (Al), or equivalents thereof, and a ceramic such as silicon dioxide ($SiO_2$) and aluminum oxide ($Al_2O_3$), but is not limited thereto. In addition, the moisture barrier layer 152b is preferably formed as thick as possible in a range that does not impair the flexibility of the rechargeable battery 100 in terms of effects such as moisture permeation prevention.

The second resin layer 151c serves to adhere the separation layer 13 or one surface of the first electrode 11 or the second electrode 12, on which the active material is not coated. In some cases, the second resin layer 151c may directly bond the encapsulation unit 150 disposed at the edges of the first exterior member 151 and the second exterior member 152 by using thermal fusion without a separate adhesive. The second resin layer 151c may be formed of, for example, a copolymer of a polyolefin or a copolymer of a polyolefin, and more specifically, the polyolefin may be polyethylene (PE) or polypropylene (PP), but is not limited thereto.

In general, the electrode tab connected to each electrode in the rechargeable battery has a structure that is drawn out between the upper exterior member and the lower exterior member. For example, if the upper and lower exterior members are square, the encapsulation region has at least four sealing surfaces because the encapsulation region has a rectangular ring shape, and the electrode tab may be directly and indirectly in contact with at least one of these sealing surfaces and drawn out to the outside.

The process of sealing the upper and lower exterior members may, for example, seal the edges of the upper and lower exterior members by thermal fusion. However, since the sealing surface where the electrode tab is drawn out has to be heated while avoiding the area where the electrode tab is disposed, the sealing process has to be performed separately from the sealing surface where the electrode tab is not drawn out.

Therefore, part of the sealing surfaces have areas that are heat-sealed more than once, and the sealing process frequently causes deformation or poor sealing of the material of the exterior member located in these areas. This has causes a problem of water penetrating into the exterior member or leaking of the electrolyte solution inside the exterior member to the outside.

However, in the present disclosure, the first electrode tab 21 and the second electrode tab 22 are not drawn out between the first and second exterior members 151 and 152, but they are drawn out to the outside through the first draw-out unit 31 and the second draw-out unit 32 disposed at one end of the first exterior member 151 and the second exterior member 152, respectively. Therefore, in the present disclosure, the sealing process of mutually bonding all edges of the first exterior member 151 and the second exterior member 152 may be carried out by a single process that simultaneously heat-bonds the entire edges of the first exterior member 151 or the second exterior member 152 or coats an adhesive to all edges. That is, all surfaces of the edge of the first exterior member 151 and the second exterior member 152 may be bonded simultaneously.

In addition, the one-time bonding process as described above can significantly improve productivity because the sealing process may be simultaneously performed on a plurality of rechargeable batteries in a batch type or an in-line type.

Figure 4:
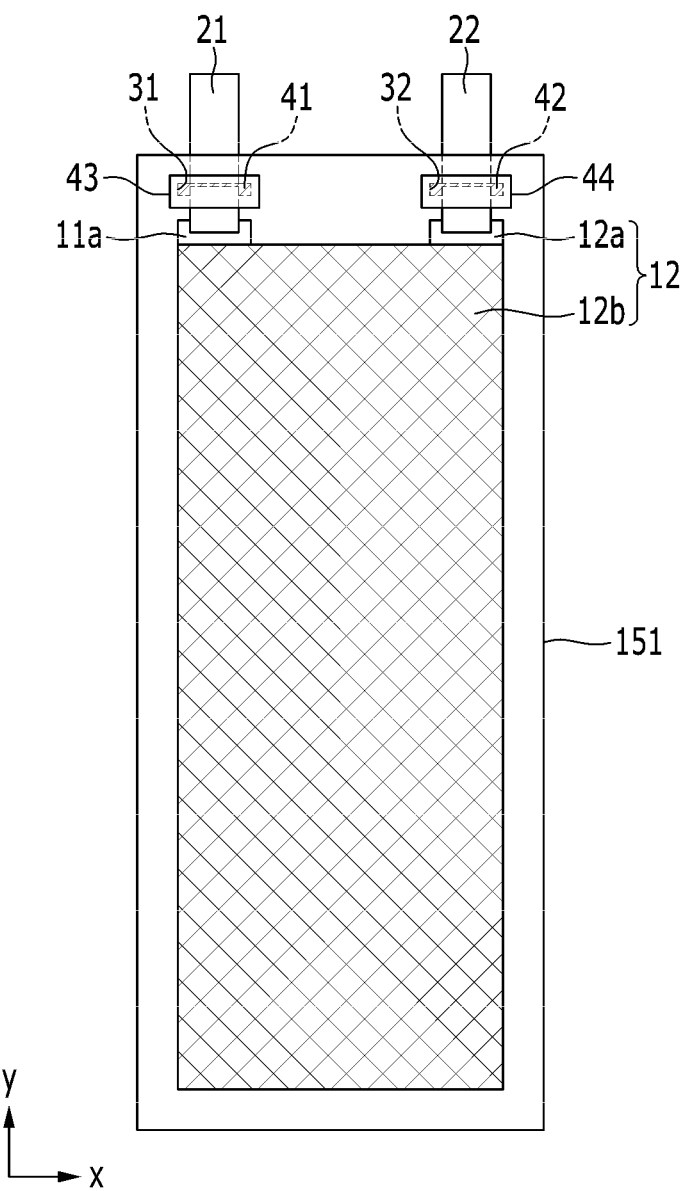
FIG. 4 is an xy top plan view of a rechargeable battery according to another exemplary embodiment of the present disclosure.

FIG. 4 is an xy top plan view of a rechargeable battery according to another exemplary embodiment of the present disclosure. In describing the rechargeable battery 101 of the present exemplary embodiment, the detailed description of the same configurations as those of the rechargeable battery 100 according to the above-described FIG. 1 to FIG. 3 is omitted.

Referring to FIG. 4, the rechargeable battery 101 of the present exemplary embodiment may further include a third encapsulation unit 43 covering the first draw-out unit 31 and a fourth encapsulation unit 44 covering the second draw-out unit 32.

The third encapsulation unit 43 and the fourth encapsulation unit 44 may be, for example, at least one of an insulating tape, a sealing tape (4411N, 3M Co., Ltd.), a Kapton tape, and a polyimide tape.

As such, when the third encapsulation unit 43 and the fourth encapsulation unit 44 covering the first draw-out unit 31 and the second draw-out unit 32 are further included, the electrolyte solution inside the rechargeable battery 101 may be more prevented from leaking, such that there is an advantage that the durability may be improved.

Figure 5:
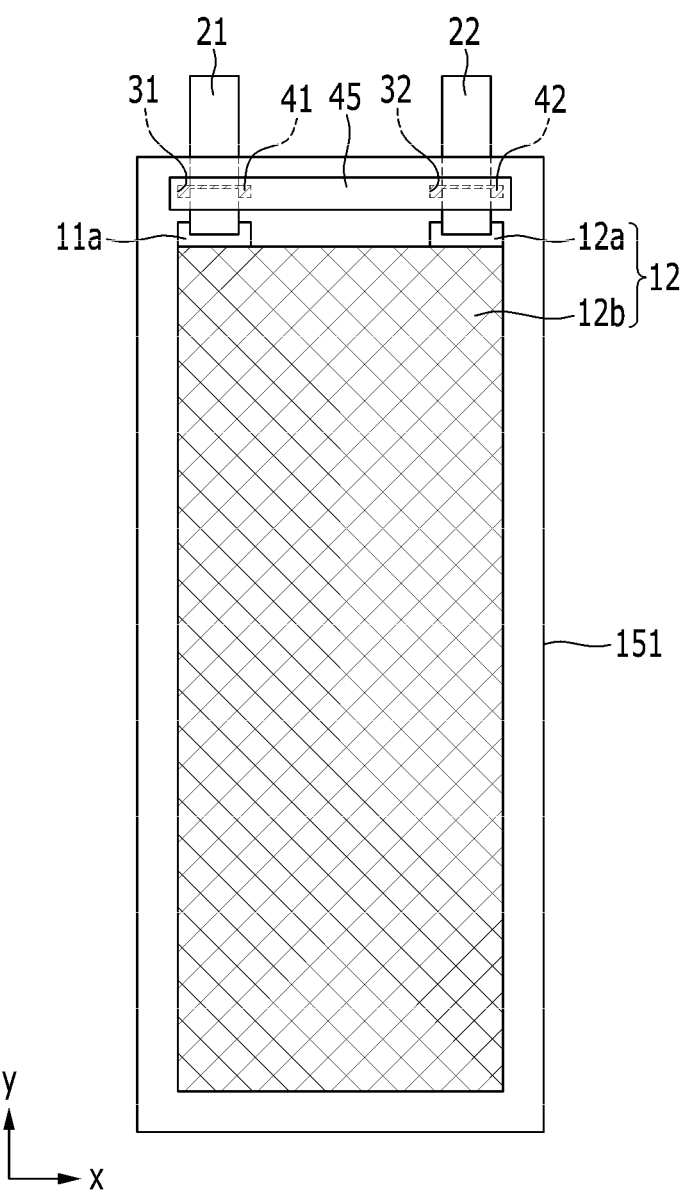
FIG. 5 is a view showing an exemplary variation in which third and fourth encapsulation units are varied in FIG. 4.

FIG. 5 is a view showing an exemplary variation in which the third and fourth encapsulation units 43 and 44 are varied from those in FIG. 4. Referring to FIG. 5, the third and fourth encapsulation units may be integrally extended to constitute a fifth encapsulation unit 45. In this case, there is an advantage that the convenience of the sealing process is increased.

Figure 6:
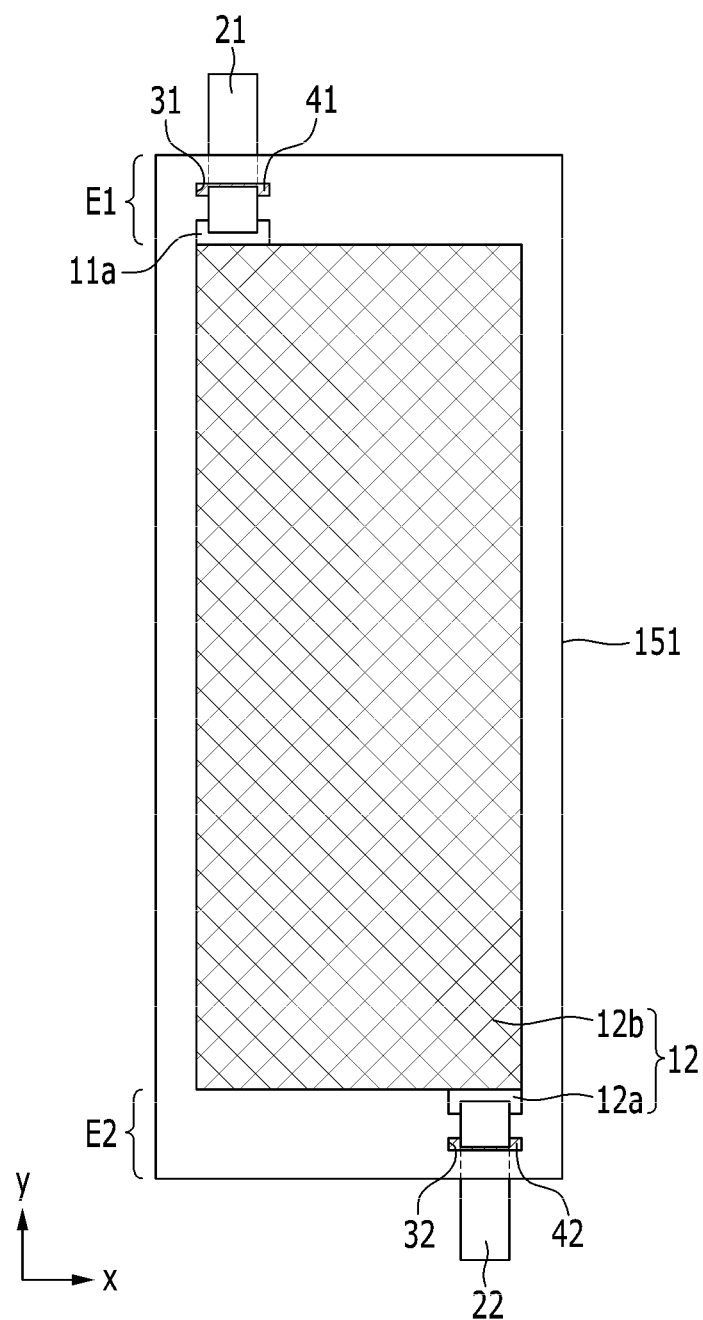
FIG. 6 and FIG. 7 are xy top plan views of a rechargeable battery according to another exemplary embodiment of the present disclosure, respectively.

FIG. 6 is an xy top plan view of a rechargeable battery according to another exemplary embodiment of the present disclosure, respectively. For convenience, FIG. 6 shows the xy top plan view in the state that the second exterior member is removed like in FIG. 3. In describing the rechargeable battery 102 of the present exemplary embodiment, the detailed description of the same configurations as in the rechargeable battery 100 according to above-described FIG. 1 to FIG. 3 is omitted. In addition, the rechargeable battery 102 according to the present exemplary embodiment may be applied with additional configurations and/or the exemplary variation of the rechargeable battery 101 according to another exemplary embodiment described in FIG. 4 and FIG. 5.

Referring to FIG. 6, the first draw-out unit 31 may be disposed at a first end E1 of the first exterior member 151, and the second draw-out unit 32 may be disposed at a second end E2 facing the first end E1 of the first exterior member 151. Alternatively, although not shown, the first draw-out unit 31 may be disposed at the first end of the second exterior member 152, and the second draw-out unit 32 may be disposed at the second end facing the first end of the second exterior member 152.

That is, the first draw-out unit 31 and the second draw-out unit 32 may both be formed at only one of the first exterior member 152 or the second exterior member 152, and may be respectively disposed at the end portions facing each other. In addition, in the present exemplary embodiment, the first draw-out unit 31 and the second draw-out unit 32 may be disposed to face each other in a diagonal direction in the first exterior member 151 or the second exterior member 152.

Figure 7:
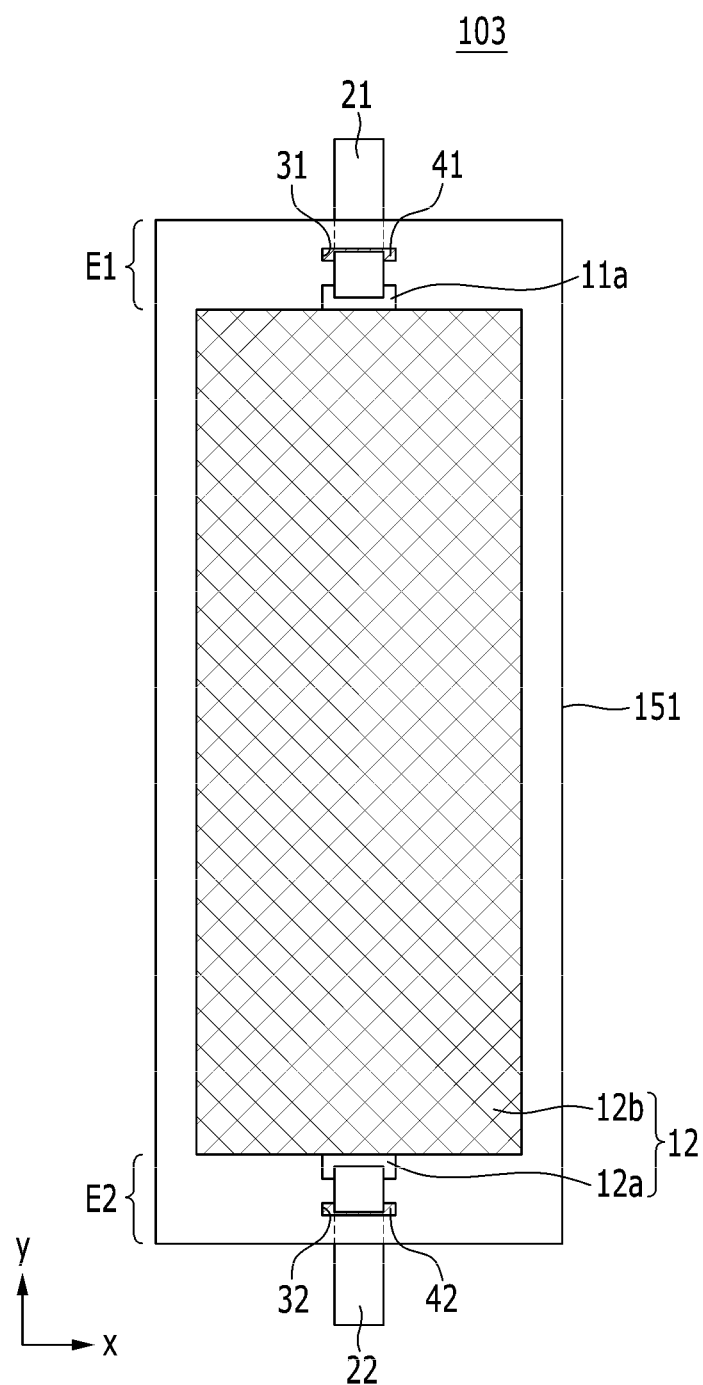

FIG. 7 is an xy top plan view of a rechargeable battery according to another exemplary embodiment of the present disclosure. For convenience, FIG. 7 shows the xy top plan view in the state that the second exterior member is removed like in FIG. 3. In describing the rechargeable battery 103 of the present exemplary embodiment, the detailed description of the same configurations as in the rechargeable battery 100 according to above-described FIG. 1 to FIG. 3 is omitted. In addition, the rechargeable battery 103 according to the present exemplary embodiment may be applied with additional configurations and/or the exemplary variation of the rechargeable battery 101 according to another exemplary embodiment described in FIG. 4 and FIG. 5.

Referring to FIG. 7, while the first draw-out unit 31 is disposed at the first end E1 of the first exterior member 151 and the second draw-out unit 32 is disposed at the second end E2 facing the first end E1 of the first exterior member 151, the first draw-out unit 31 and the second draw-out unit 32 may be disposed to face each other in a length direction of the rechargeable battery 103. Also, although not shown, the first draw-out unit 31 may be disposed at the first end of the second exterior member 152 and the second draw-out unit 32 may be disposed at the second end facing the first end of the second exterior member 152, and the first draw-out unit 31 and the second draw-out unit 32 may be disposed to face each other in the length direction of the rechargeable battery 103.

That is, the first draw-out unit 31 and the second draw-out unit 32 may both be formed on only one of the first exterior member 152 and the second exterior member 152, each disposed at opposite ends to each other, and the first draw-out unit 31 and the second draw-out unit 32 may be disposed on the same axis in the y-axis direction.

FIG. 7 shows a case where the first draw-out unit 31 and the second draw-out unit 32 are disposed to face each other in the center of the width direction of the rechargeable battery 103. Although not shown, the first draw-out unit 31 and the second draw-out unit 32 may be disposed to face each other in the left region in the x-axis direction of FIG. 7, or may be disposed to face each other in the right region of the x-axis direction.

Figure 8:
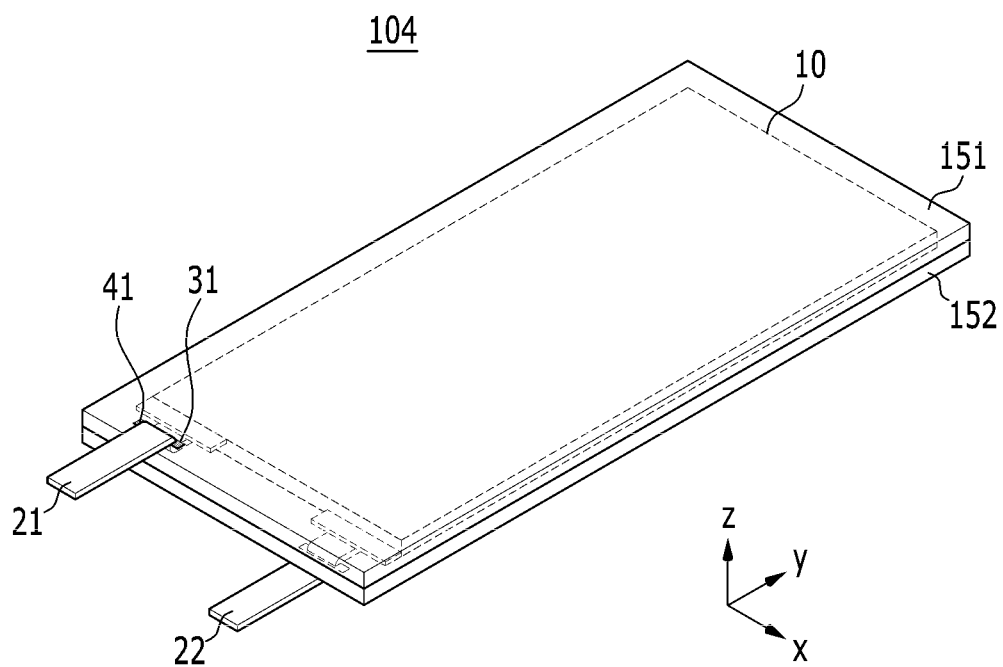
FIG. 8 is a perspective view of a rechargeable battery according to another exemplary embodiment of the present disclosure.
Figure 9:
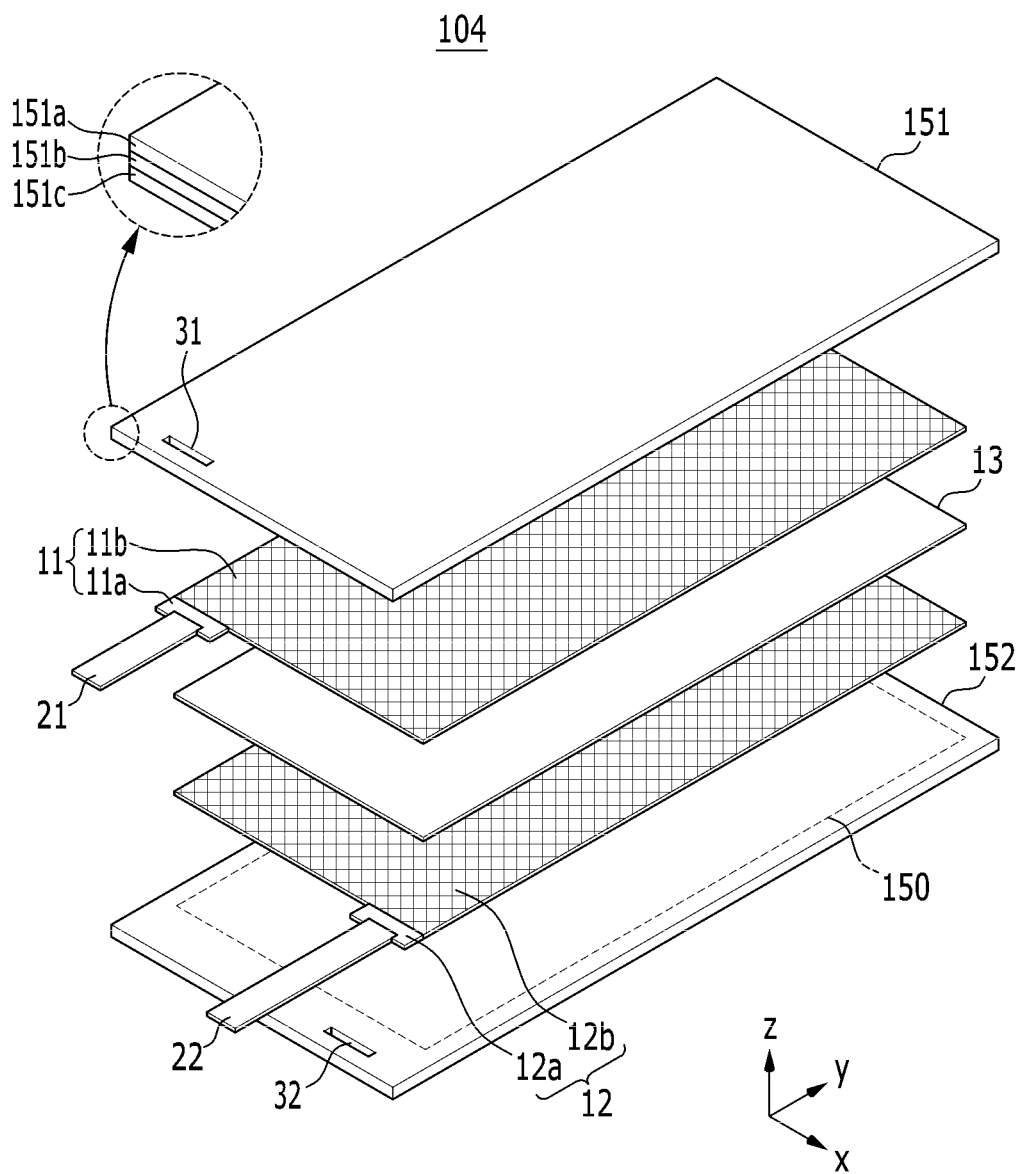
FIG. 9 is an exploded perspective view of a rechargeable battery of FIG. 8.

FIG. 8 is a perspective view of a rechargeable battery according to another exemplary embodiment of the present disclosure, and FIG. 9 is an exploded perspective view of a rechargeable battery of FIG. 8. In describing the rechargeable battery 104 of the present exemplary embodiment, the detailed description of the same configurations as in the rechargeable battery 100 according to above-described FIG. 1 to FIG. 3 is omitted. In addition, the rechargeable battery 104 according to the present exemplary embodiment may be applied with the additional configurations and/or the exemplary variation of the rechargeable battery 101 according to another exemplary embodiment described in FIG. 4 and FIG. 5.

Referring to FIG. 8 and FIG. 9, the first draw-out unit 31 may be disposed at one end of the first exterior member 151, and the second draw-out unit 32 may be disposed at one end of the second exterior member 152. Although not shown, the first draw-out unit 31 may be disposed at one end of the second exterior member 152, and the second draw-out unit 32 may be disposed at one end of the first exterior member 151.

FIG. 8 and FIG. 9 show a case that the first draw-out unit 31 and the second draw-out unit 32 are respectively formed on the first exterior member 151 and the second exterior member 152, respectively, and are disposed at one end parallel to the z-axis direction. In this case, the first draw-out unit 31 may be disposed at the left in the x-axis direction, the second draw-out unit 32 may be disposed at the right in the x-axis direction, the first draw-out unit 31 may be disposed at the right in the x-axis direction, and the second draw-out unit 32 may be disposed at the left in the x-axis direction. Alternatively, the first draw-out unit 31 and the second draw-out unit 32 may be disposed on the same axis in the z-axis direction.

Alternatively, while the first draw-out unit 31 is disposed at the first exterior member 151 and the second draw-out unit 32 is disposed at the second exterior member 152, the position of the first draw-out unit 31 and the second draw-out unit 32 may be formed as described in FIG. 6 and FIG. 7.

That is, except for the point that the first draw-out unit 31 is disposed at the first exterior member 151 and the second draw-out unit 32 is disposed at the second exterior member 152, the first draw-out unit 31 and the second draw-out unit 32 may be formed like in FIG. 6 and FIG. 7 on the xy plan. Therefore, the first draw-out unit 31 and the second draw-out unit 32 may be disposed to face in the diagonal direction as described in the exemplary embodiment of FIG. 6, and may be disposed on the same axis in the y-axis direction as described in the exemplary embodiment according to FIG. 7.

Figure 10:
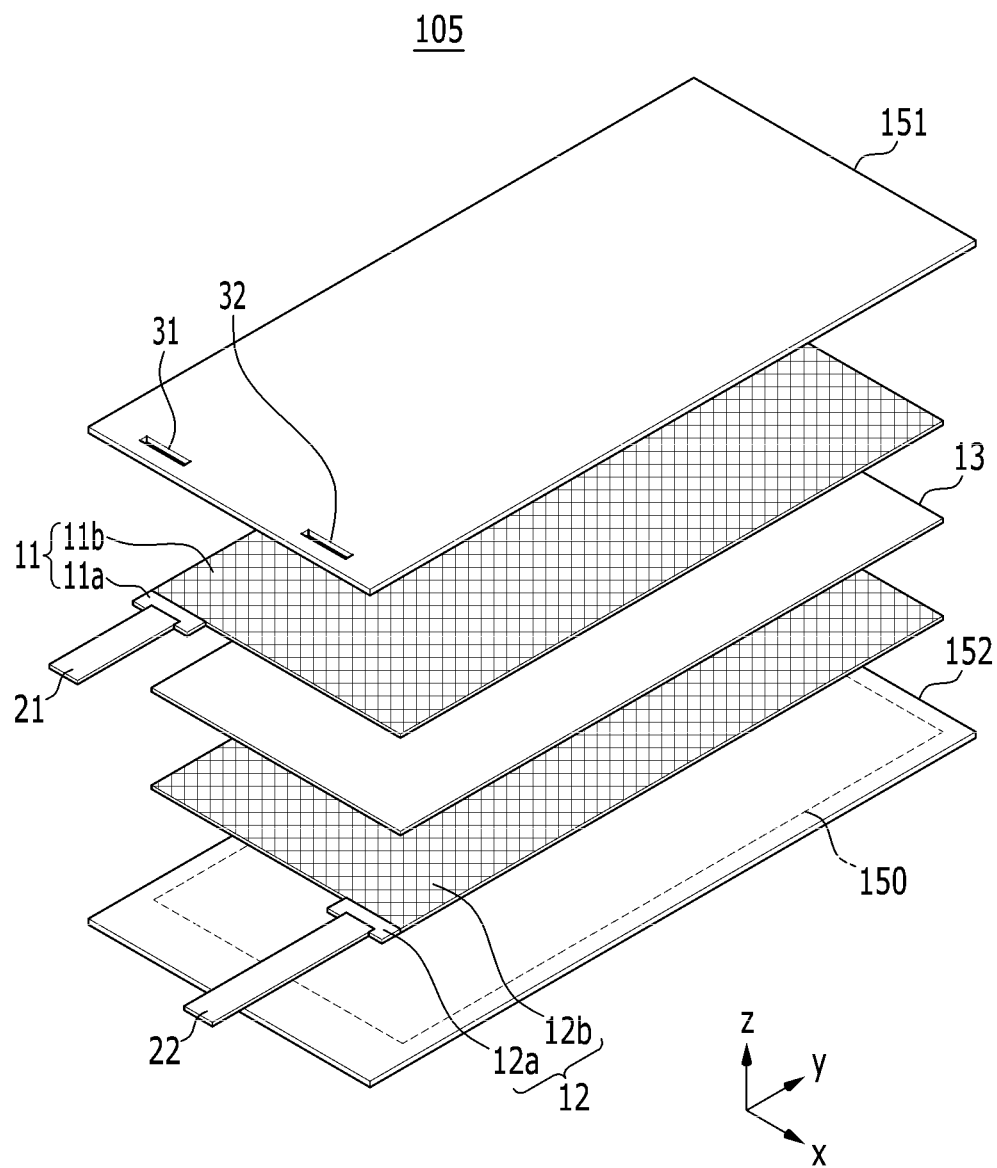
FIG. 10 is an exploded perspective view of a rechargeable battery according to another exemplary embodiment of the present disclosure.

FIG. 10 is an exploded perspective view of a rechargeable battery according to another exemplary embodiment of the present disclosure. In describing the rechargeable battery 105 of the present exemplary embodiment, the detailed description of the same configurations as in the rechargeable battery 100 according to FIG. 1 to FIG. 3 as above-described is omitted. Also, the rechargeable battery 105 according to the present exemplary embodiment may be applied with the additional configurations and/or the exemplary variations of the rechargeable batteries 101, 102, 103, and 104 according to other exemplary embodiments described in FIG. 4 to FIG. 9.

Referring to FIG. 10, in the rechargeable battery 105 according to the present exemplary embodiment, at least one of the first exterior member 151 and the second exterior member 152 may have a single layer structure.

In this case, at least one of the first exterior member 151 and the second exterior member 152 having the single layer structure, for example, may be formed of one or more selected from a group including a polymer resin including polyethylene terephthalate (PET), polyethylene naphthalate (PEN), polycarbonate, (PC), polyarylate (PAR), polyetherimide (PEI), polyethersulfone (PES), and polyimide (PI), polypropylene (PP), polyethylene (PE), polytetrafluoroethylene (PTFE), chlorotrifluoroethylene (CTFE), and nylon; and a thin ceramic including a thin glass and aluminum oxide ($Al_2O_3$).

In this case, the thickness of the first exterior member 151 and/or the second exterior member 152 having the single layer structure may be 5 μm to 500 μm, more preferably 50

μm to 200 μm, or 50 μm to 20 μm. If the thickness of the first exterior member 151 and/or the second exterior member 152 is 50 μm or less, the flexible characteristic may be improved and the capacity of the battery per unit volume may be improved, however It may be resistant to moisture and damage from the outside, and if it is over 500 μm, it is strong against external moisture and damage, but loses its flexible characteristic and battery capacity per unit volume may be reduced.

In the present exemplary embodiment, at least one of the first exterior member 151 and/or second exterior member 152 may further include an adhesive layer positioned along the edge.

The adhesive layer may include, for example, one or more selected from a group including glass frit, butyl rubber, hot butyl, epoxy-based adhesives, polyurethane-based adhesives, acrylate-based adhesives, ceramic-based adhesives, and polytetrafluoroethylene (PTFE)-based adhesives.

When applying the rechargeable battery 105 in which the first exterior member 151 and the second exterior member 152 are formed of the single layer structure like the present exemplary embodiment of the display device, the display device with an excellent bending characteristic may be realized.

Figure 11:
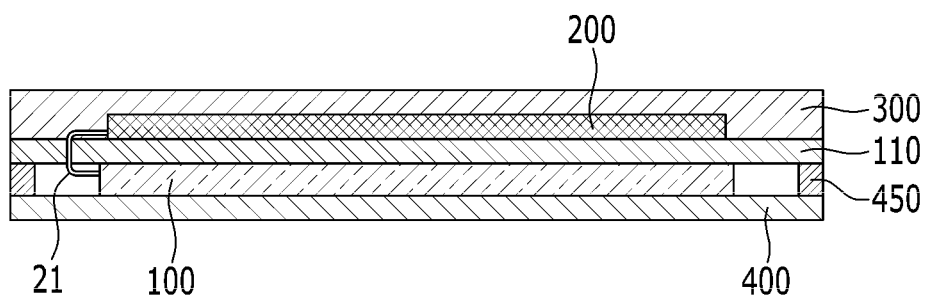
FIG. 11 is a schematic cross-sectional view of a display device according to an exemplary embodiment of the present disclosure.

Next, the configuration of the display device according to an exemplary embodiment of the present disclosure is described. FIG. 11 is a schematic cross-sectional view of a display device according to an exemplary embodiment of the present disclosure.

Referring to FIG. 11, the display device according to an exemplary embodiment of the present disclosure may include a substrate 110, a display panel 200, and the rechargeable battery 100 according to the above-described present disclosure.

In this case, the substrate 110 may be a flexible substrate that is flexible and bends well, and may include, for example, plastic. More specifically, the substrate 110 may include at least one selected from the group consisting of the polymer resin including polyethylene terephthalate (PET), polyethylene naphthalate (PEN), polycarbonate, (PC), polyarylate (PAR), polyetherimide (PEI), polyethersulfone (PES), and polyimide (PI); and the thin ceramic including thin glass and thin aluminum oxide (thin $Al_2O_3$), but is not limited thereto.

The display panel 200 may be disposed on the first surface of the substrate 110. The display panel 200 may be applied without limitation as long as it may be implemented as a flexible display device, and for example, the display panel 200 may be a display panel of an organic light emitting diode (OLED) or a display panel of an organic photovoltaic (OPV) cell.

In the substrate 110, the rechargeable battery 100 according to the present disclosure may be disposed on the second surface that is the opposite surface of the first surface, that is, the surface opposite to the surface on which the display panel 200 is disposed. For convenience, FIG. 11 shows the rechargeable battery 100 according to an exemplary embodiment, however the rechargeable battery according to another exemplary embodiment described in FIG. 4 to FIG. 9 may be applied to the display device of the present disclosure.

A first protection layer 300 is disposed on the display panel 200. The first protection layer 300 seals and protects the display panel 200 disposed on the substrate 110 from the outside.

A second protection layer 400 is disposed under the rechargeable battery 100, and a third protection layer 450 is disposed along the edges of the substrate 110 and the second protection layer 400. The second protection layer 400 and the third protection layer 450 seal and protect the rechargeable battery 100 disposed under the substrate 110 from the outside.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

31: first draw-out unit
32: second draw-out unit
41: first encapsulation unit
42: second encapsulation unit
151: first exterior member
151: second exterior member
100, 101, 102, 103, 104, 105: rechargeable battery
10: electrode assembly
21: first electrode tab
22: second electrode tab
11: first electrode
12: second electrode
13: separation layer

The invention claimed is:

1. A rechargeable battery comprising:
an electrode assembly comprising a first electrode, a second electrode, and a separation layer interposed between the first electrode and the second electrode;
a first electrode tab electrically connected to the first electrode;
a second electrode tab electrically connected to the second electrode; and
a first exterior member and a second exterior member receiving the electrode assembly and disposed to face each other,
wherein at least one selected from the first exterior member and the second exterior member comprises at least one selected from a first draw-out unit drawing out the first electrode tab and a second draw-out unit drawing out the second electrode tab, and
wherein the at least one selected from the first draw-out unit and the second draw-out unit is a perforation in the first exterior member or the second exterior member.

2. The rechargeable battery of claim 1, wherein the first draw-out unit and the second draw-out unit are disposed with a predetermined interval on at least one selected from the first exterior member and the second exterior member.

3. The rechargeable battery of claim 1, wherein the first draw-out unit is disposed at a first end of the first exterior member, and
the second draw-out unit is disposed at a second end facing the first end of the first exterior member.

4. The rechargeable battery of claim 3, wherein the first draw-out unit and the second draw-out unit are disposed to face each other in a length direction of the rechargeable battery.

5. The rechargeable battery of claim 1, wherein the first draw-out unit is disposed at a first end of the second exterior member, and
the second draw-out unit is disposed at a second end facing the first end of the second exterior member.

6. The rechargeable battery of claim 5, wherein
the first draw-out unit and the second draw-out unit are disposed to face each other in a length direction of the rechargeable battery.

7. A rechargeable battery comprising:
an electrode assembly comprising a first electrode, a second electrode, and a separation layer interposed between the first electrode and the second electrode;
a first electrode tab electrically connected to the first electrode;
a second electrode tab electrically connected to the second electrode; and
a first exterior member and a second exterior member receiving the electrode assembly and disposed to face each other,
wherein at least one selected from the first exterior member and the second exterior member comprises at least one selected from a first draw-out unit drawing out the first electrode tab and a second draw-out unit drawing out the second electrode tab,
wherein the first draw-out unit is disposed at one end of the first exterior member, and
wherein the second draw-out unit is disposed at one end of the second exterior member.

8. A rechargeable battery comprising:
an electrode assembly comprising a first electrode, a second electrode, and a separation layer interposed between the first electrode and the second electrode;
a first electrode tab electrically connected to the first electrode;
a second electrode tab electrically connected to the second electrode; and
a first exterior member and a second exterior member receiving the electrode assembly and disposed to face each other,
wherein at least one selected from the first exterior member and the second exterior member comprises at least one selected from a first draw-out unit drawing out the first electrode tab and a second draw-out unit drawing out the second electrode tab,
wherein the first draw-out unit is disposed at one end of the second exterior member, and
wherein the second draw-out unit is disposed at one end of the first exterior member.

9. The rechargeable battery of claim 1, wherein
the first electrode tab extends integrally with an uncoated region of the first electrode, and
the second electrode tab extends integrally with an uncoated region of the second electrode.

10. The rechargeable battery of claim 1, further comprising
a first encapsulation unit and a second encapsulation unit respectively closing and sealing the first draw-out unit and the second draw-out unit.

11. The rechargeable battery of claim 10, wherein
at least one selected from the first encapsulation unit and the second encapsulation unit comprises one kind or more selected from a group including polyisobutylene (PIB), butyl rubber, polytetrafluoroethylene (PTFE), epoxy, polydimethylsiloxane (PDMS), polypropylene (PP), polyethylene (PE), and ceramic.

12. The rechargeable battery of claim 10, further comprising:
a third encapsulation unit covering the first draw-out unit; and
a fourth encapsulation unit covering the second draw-out unit.

13. The rechargeable battery of claim 12, wherein
the third encapsulation unit and the fourth encapsulation unit are integrally extended.

14. The rechargeable battery of claim 12, wherein
the third encapsulation unit and fourth encapsulation unit are at least one selected from an insulating tape, a sealing tape, a polyimide tape, and a polyimide silicon adhesive tape.

15. The rechargeable battery of claim 1, wherein
at least one selected from the first exterior member and the second exterior member comprises a first resin layer, a moisture barrier layer, and a second resin layer.

16. The rechargeable battery of claim 1, wherein
at least one selected from the first exterior member and the second exterior member is a single layer structure formed of one or more selected from a group including a polymer resin including polyethylene terephthalate (PET), polyethylene naphthalate (PEN), polycarbonate, (PC), polyarylate (PAR), polyetherimide (PEI), polyethersulfone (PES), and polyimide (P1), polypropylene (PP), polyethylene (PE), polytetrafluoroethylene (PTFE), chlorotrifluoroethylene (CTFE), nylon; and a thin ceramic including a thin glass and an aluminum oxide ($Al_2O_3$).

17. The rechargeable battery of claim 16, wherein
at least one thickness selected from the first exterior member and the second exterior member is 5 μm to 500 μm.

18. The rechargeable battery of claim 1, wherein
at least one selected from the first exterior member and the second exterior member further includes an adhesive layer disposed on an edge thereof.

19. The rechargeable battery of claim 18, wherein
the adhesive layer includes at least one selected from a group including glass frit, butyl rubber, hot butyl, epoxy-based adhesives, polyurethane-based adhesives, acrylate-based adhesives, ceramic-based adhesives, and polytetrafluoroethylene (PTFE)-based adhesives.

20. A display device comprising:
a substrate;
a display panel disposed on a first surface of the substrate; and
the rechargeable battery of claim 1 disposed on a second surface opposite to the first surface and electrically connected to the display panel to supply power.

* * * * *